(12) United States Patent
Yang et al.

(10) Patent No.: US 11,096,238 B2
(45) Date of Patent: Aug. 17, 2021

(54) METHOD FOR DETERMINING A DISCONTINUOUS RECEPTION STATE, TERMINAL DEVICE AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 111 days.

(21) Appl. No.: 16/507,547

(22) Filed: Jul. 10, 2019

(65) Prior Publication Data
US 2019/0335530 A1 Oct. 31, 2019

Related U.S. Application Data

(63) Continuation of application No. PCT/CN2017/070749, filed on Jan. 10, 2017.

(51) Int. Cl.
*H04W 4/00* (2018.01)
*H04W 76/28* (2018.01)
(Continued)

(52) U.S. Cl.
CPC ......... *H04W 76/28* (2018.02); *H04W 72/042* (2013.01); *H04W 76/27* (2018.02)

(58) Field of Classification Search
None
See application file for complete search history.

(56) References Cited

U.S. PATENT DOCUMENTS

2015/0327324 A1* 11/2015 Wei .................. H04W 52/02
370/280
2016/0073344 A1 3/2016 Vutukuri et al.
(Continued)

FOREIGN PATENT DOCUMENTS

CN 101583178 A 11/2009
CN 102123456 A 7/2011
(Continued)

OTHER PUBLICATIONS

3GPP TS 36.321 V8.11.0 (Dec. 2011); 3rd Generation Partnership Project;Technical Specification Group Radio Access Network;Evolved Universal Terrestrial Radio Access (E-UTRA);Medium Access Control (MAC) protocol specification (Release 8).
(Continued)

*Primary Examiner* — Phirin Sam

(57) ABSTRACT

An embodiment of the present application provides a method for determining a DRX state. The method includes: receiving, by a terminal device, first indicating information transmitted from a network device, where the first indicating information is used for indicating the terminal device to switch a DRX state, or used for indicating a duration for which the terminal device stays in a DRX state; and switching, by the terminal device, a DRX state in which the terminal device currently stays according to the first indicating information, or determining the duration for which the terminal device stays in the DRX state according to the first indicating information, the DRX state in which the terminal device currently stays is a first DRX state or a second DRX state, where a receiver of the terminal device is turned on when in the first DRX state, and turned off when in the second DRX state.

24 Claims, 3 Drawing Sheets

(51) Int. Cl.
*H04W 76/27* (2018.01)
*H04W 72/04* (2009.01)

(56) References Cited

U.S. PATENT DOCUMENTS

| | | |
|---|---|---|
| 2016/0198340 A1 | 7/2016 | Joung et al. |
| 2017/0055212 A1* | 2/2017 | Yan ................... H04W 52/0216 |
| 2017/0099635 A1 | 4/2017 | Uchino et al. |
| 2017/0171818 A1* | 6/2017 | Agarwal ............. H04W 72/042 |
| 2017/0359849 A1* | 12/2017 | Zhang ................... H04W 72/14 |
| 2018/0132292 A1* | 5/2018 | Yang ..................... H04W 76/18 |
| 2020/0059988 A1* | 2/2020 | Tabet ................... H04W 76/28 |
| 2021/0058864 A1* | 2/2021 | Martin ................ H04W 72/048 |

FOREIGN PATENT DOCUMENTS

| | | | |
|---|---|---|---|
| CN | 102595573 | A | 7/2012 |
| CN | 103200653 | A | 7/2013 |
| EP | 3145251 | A1 | 3/2017 |
| JP | 2009077288 | A | 4/2009 |
| JP | 2015149754 | A | 8/2015 |
| RU | 2605367 | C2 | 12/2016 |
| WO | 2013054850 | A1 | 4/2013 |
| WO | 2015174327 | A1 | 11/2015 |

OTHER PUBLICATIONS

The First Office Action of corresponding Singaporean application No. 11201906396Y, dated Jul. 20, 2020.
The First Office Action of corresponding Canadian application No. 3049700, dated Sep. 14, 2020.
The first Office Action of corresponding Russian application No. 2019125192, dated Mar. 6, 2020.
International Search Report dated Sep. 22, 2017; PCT/CN2017/070749.
Extended European Search Report dated Oct. 9, 2019, Appln. No. 17891027.9.
The first Office Action of corresponding Japanese application No. 2019-537330, dated Jan. 5, 2021.
3rd Generation Partnership Project; Technical Specification Group Radio Access Network; Evolved Universal Terrestrial Radio Access (E-UTRA); Medium Access Control (MAC) protocol specification(Release 14), 3GPP TS 36.321V14.1.0, Dec. 30, 2016, Section 3.1, Section 4.5.3, Section 5.7.
Panasonic, DRX handling in LTE, 3GPP TSG-RAN WG2#57bis R2-071382, Mar. 22, 2007.
The first Office Action of corresponding Indian application No. 201917030132, dated Feb. 5, 2021.
The first Office Action of corresponding Taiwan application No. 107100444, dated Apr. 15, 2021.
The first Office Action of corresponding European application No. 17891027.9, dated Apr. 26, 2021.

* cited by examiner

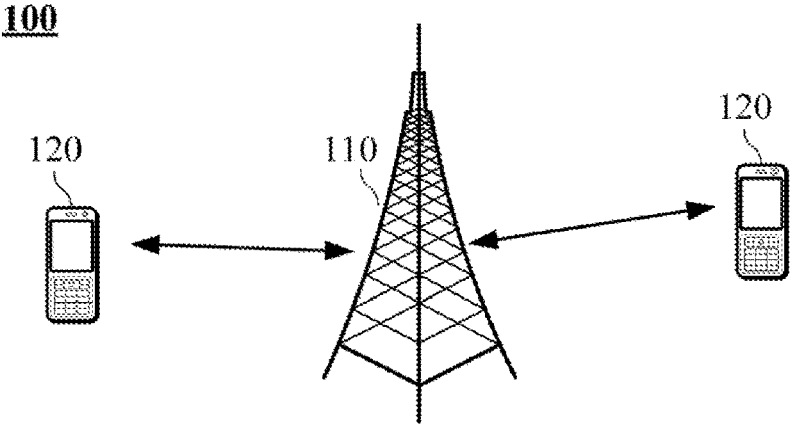

FIG. 1

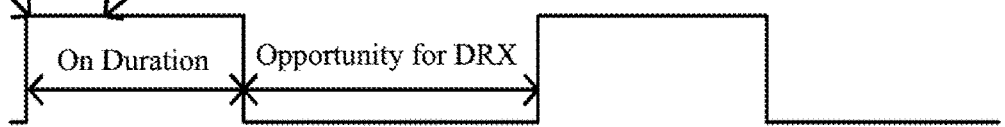

FIG. 2

| The terminal device receives first indicating information transmitted from a network device, where the first indicating information is configured to indicate the terminal device to switch a DRX state, or to indicate the duration for which the terminal device stays in a DRX state | 310 |

| The terminal device switches a DRX state in which the terminal device currently stays according to the first indicating information, or determines the duration for which the terminal device stays in the DRX state according to the first indicating information, where the DRX state in which the terminal device currently stays is a first DRX state or a second DRX state, where a receiver of the terminal device is turned on when in the first DRX state, and turned off when in the second DRX state | 320 |

FIG. 3

METHOD FOR DETERMINING A DISCONTINUOUS RECEPTION STATE, TERMINAL DEVICE AND NETWORK DEVICE

CROSS-REFERENCE TO RELATED APPLICATIONS

This application is a continuation of International Application No. PCT/CN2017/070749, filed on Jan. 10, 2017, entitled "METHOD, TERMINAL DEVICE AND NETWORK DEVICE FOR DETERMINING DISCONTINUOUS RECEPTION STATUS", the content of which is incorporated herein by reference in its entirety.

TECHNICAL FIELD

Embodiments of the present application relate to the field of communication and, more particularly, to a method for determining a discontinuous reception state, a terminal device and a network device.

BACKGROUND

For reducing power consumption, a terminal device may apply discontinuous reception (DRX) in receiving data from a network device. In order to implement DRX functionalities in existing solutions, the network device operates through radio resource control (RRC) signaling to statically configure DRX parameters for the terminal device. For instance, the network device operates through RRC signaling to configure parameters such as On Duration Timer, DRX Inactivity Timer, or the like. However, such approach is insufficiently flexible when a change needs to be made to the DRX state in which the terminal device stays.

SUMMARY

An embodiment of the present application provides a method for determining a discontinuous reception (DRX) state, a terminal device and a network device, so as to dynamically adjust the DRX state that the terminal device is in.

A first aspect provides a method for determining a discontinuous reception (DRX) state, the method including: receiving, by a terminal device, first indicating information transmitted from a network device, where the first indicating information is used for indicating the terminal device to switch a DRX state, or used for indicating a duration for which the terminal device stays in a DRX state; and switching, by the terminal device, a DRX state in which the terminal device currently stays according to the first indicating information, or determining the duration for which the terminal device stays in the DRX state according to the first indicating information, where the DRX state in which the terminal device currently stays is a first DRX state or a second DRX state, where a receiver of the terminal device is turned on when in the first DRX state, and turned off when in the second DRX state.

With the first indicating information, the DRX state, or the duration of being in the DRX state, may be dynamically adjusted for the terminal device, which in turn improves the efficiency in transmitting data in the DRX mode by the terminal device, and reduces power consumption for the terminal device.

In conjuncture with the first aspect, in some implementations of the first aspect, the DRX state in which the terminal device currently stays is a first DRX state, the first indicating information indicates the terminal device to switch to the second DRX state, and the switching, by the terminal device, a DRX state includes: switching, by the terminal device, from the first DRX state to the second DRX state according to the first indicating information.

The terminal device is capable of switching from the first DRX state to the second DRX state according to the indication by the first indicating information when the DRX state in which the terminal device currently stays is a first DRX state, which enables a more flexible and convenient switching from the first DRX state to the second DRX state as compared with prior art in which DRX state switching has to wait until the timer of the first DRX state has expired.

In conjuncture with the first aspect, in some implementations of the first aspect, the DRX state in which the terminal device currently stays is the first DRX state, the first indicating information is used for indicating the duration for which the terminal device stays in the first DRX state, and the determining, by the terminal device, the duration for which the terminal device stays to remain in the DRX state includes: determining, by the terminal device, the duration for which the terminal device stays in the first DRX state according to the first indicating information.

Compared with prior art solution in which a fixed duration is statically configured for the first DRX state, the embodiment of the present application is able to operate via the first indicating information to flexibly adjust the duration that the terminal device is to remain in the first DRX state.

In conjuncture with the first aspect, in some implementations of the first aspect, the first indicating information is specifically used for indicating a duration for which the first DRX state lasts is a first time interval, and the determining, by the terminal device, the duration for which the first DRX state lasts according to the first indicating information includes: determining, by the terminal device, the first time interval to be the duration for which the first DRX state lasts according to the first indicating information.

In conjuncture with the first aspect, in some implementations of the first aspect, the first indicating information is specifically used for indicating that the first DRX state is to last until a first moment, and the determining, by the terminal device, the duration for which the first DRX state lasts according to the first indicating information includes: determining, by the terminal device, that the first DRX state lasts until the first moment according to the first indicating information.

When indicating the duration that the terminal device is to remain in the first DRX state, the first indicating information may indicate the time interval that the terminal device is in the first DRX state, as well as the moment that the first DRX state is to terminate, offering flexibility in terms of indicating manners.

In conjuncture with the first aspect, in some implementations of the first aspect, the DRX state in which the terminal device currently stays is the first DRX state, the first indicating information is used for indicating a duration for which the terminal device stays in the second DRX state, where the second DRX state is a DRX state that the terminal device stays in after switching away from the first DRX state, and the determining, by the terminal device, the duration for which the terminal device stays in the DRX state includes: determining, by the terminal device, the duration for which the terminal device stays in the second DRX state according to the first indicating information.

In addition to indicating the duration that the terminal device is to remain in its current DRX state, the first indicating information may also indicate a duration for the next DRX state that the terminal device is in.

In conjuncture with the first aspect, in some implementations of the first aspect, the first indicating information is specifically used for indicating a duration for which the second DRX state lasts is a second time interval, and the determining, by the terminal device, the duration for which the second DRX state lasts according to the first indicating information includes: determining, by the terminal device, the second time interval to be the duration for which the second DRX state lasts according to the first indicating information.

In conjuncture with the first aspect, in some implementations of the first aspect, the first indicating information is specifically used for indicating that the second DRX state is to last for until a second moment, and the determining, by the terminal device, the duration for which the second DRX state lasts according to the first indicating information includes: determining, by the terminal device, that the second DRX state lasts until the second moment according to the first indicating information.

In conjuncture with the first aspect, in some implementations of the first aspect, the first indicating information is carried in downlink control information (DCI).

In conjuncture with, and in some implementations of, the first aspect, the first indicating information is carried in a media access control element (MAC CE).

In conjuncture with the first aspect, in some implementations of the first aspect, the MAC CE includes at least one of a DRX command MAC CE, a long DRX command MAC CE, and a MAC CE indicated by a reserved logic channel indicator sub-header.

In conjuncture with the first aspect, in some implementations of the first aspect, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating the duration for which the terminal device stays in a DRX state.

In conjuncture with the first aspect, in some implementations of the first aspect, the receiving, by a terminal device, first indicating information transmitted from a network device includes: receiving, by the terminal device, the first indicating information transmitted from the network device via a dedicated downlink control channel or a common control channel.

In conjuncture with the first aspect, in some implementations of the first aspect, the first indicating information is used for indicating a target DRX parameter configured for the terminal device, the target DRX parameter is used for indicating the duration for which the terminal device stays in a DRX state.

In the embodiment of the present application, the first indicating information may pre-configure for a terminal device a target DRX parameter among a plurality of DRX parameters in order to provide an indication regarding the duration of the DRX state that terminal device is in.

In conjuncture with the first aspect, in some implementations of the first aspect, the first indicating information is specifically used for indicating an index of the target DRX parameter among a plurality of pre-configured DRX parameters.

According to the index of the target DRX parameter indicated by the first indicating information, the terminal device may conveniently identify the target DRX parameter among a plurality of pre-configured DRX parameters.

In conjuncture with the first aspect, in some implementations of the first aspect, the first indicating information is specifically used for indicating a difference between an index of the target DRX parameter and an index of a first DRX parameter, where the first DRX parameter is any one of a plurality of pre-configured DRX parameters.

The first DRX parameter may be a DRX parameter pre-configured by the network device via RRC signaling for the terminal device.

When adjustment need to be made to the duration of the DRX state that terminal device stays in, the target DRX parameter may be indicated by the first indicating information using a difference between an index of the target DRX parameter and an index of a first DRX parameter. Comparing the target DRX parameter is indicated by the first indicating information using a difference between an index of the target DRX parameter and an index of a first DRX parameter rather than a straightforward indication of the index of the target DRX parameter, less bits may be consumed in indicating the target DRX parameter when the index of the target DRX parameter and the index of the first DRX parameter are close.

A second aspect provides a method for determining a discontinuous reception (DRX) state, the method including: generating, by a network device, first indicating information, where the first indicating information is used for indicating a terminal device to switch a DRX state, or used for indicating a duration for which the terminal device stays in a DRX state; and transmitting, by the network device, the first indicating information to the terminal device.

With the first indicating information, the DRX state, or the duration of being in the DRX state, may be dynamically adjusted for the terminal device, which in turn improves the efficiency in transmitting data in the DRX mode by the terminal device, and reduces power consumption for the terminal device.

In conjuncture with the second aspect, in some implementations of the second aspect, the method further includes: determining, by the network device, the first indicating information according to network load.

In conjuncture with the second aspect, in some implementations of the second aspect, a DRX state in which the terminal device currently stays is a first DRX state, the first indicating information is used for indicating the terminal device to switch to a second DRX state, where a receiver of the terminal device is turned on when in the first DRX state, and turned off when in the second DRX state.

In conjuncture with the second aspect, in some implementations of the second aspect, the DRX state in which the terminal device currently stays is a first DRX state, the first indicating information is used for indicating the duration for which the terminal device stays in the first DRX state, where a receiver of the terminal device is turned on when in the first DRX state.

In conjuncture with the second aspect, in some implementations of the second aspect, the first indicating information is specifically used for indicating that a duration for which the first DRX state lasts is a first time interval.

In conjuncture with the second aspect, in some implementations of the second aspect, the first indicating information is specifically used for indicating that the first DRX state is to last until a first moment.

In conjuncture with the second aspect, in some implementations of the second aspect, the DRX state in which the terminal device currently stays is the first DRX state, the first indicating information is used for indicating the duration for which the terminal device stays in the second DRX state, where the second DRX state is a DRX state that the terminal device stays in after switching away from the first DRX state, where a receiver of the terminal device is turned on when in the first DRX state, and turned off when in the second DRX state.

In conjuncture with the second aspect, in some implementations of the second aspect, the first indicating information is specifically used for indicating that a duration for which the second DRX state lasts is a second time interval.

In conjuncture with the second aspect, in some implementations of the second aspect, the first indicating information is specifically used for indicating that the second DRX state is to last until a second moment.

In conjuncture with the second aspect, in some implementations of the second aspect, the first indicating information is carried in downlink control information (DCI).

In conjuncture with the second aspect, in some implementations of the second aspect, the first indicating information is carried in a media access control element (MAC CE).

In conjuncture with the second aspect, in some implementations of the second aspect, the first indicating information is carried in at least one of a DRX command MAC CE, a long DRX command MAC CE, and a MAC CE indicated by a reserved logic channel indicator sub-header.

In conjuncture with the second aspect, in some implementations of the second aspect, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating a duration for which the terminal device stays in a DRX state.

In conjuncture with the second aspect, in some implementations of the second aspect, the transmitting, by the network device, the first indicating information to the terminal device includes: transmitting, by the network device, the first indicating information to the terminal device via a dedicated downlink control channel or a common control channel.

In conjuncture with the second aspect, in some implementations of the second aspect, the first indicating information is used for indicating a target DRX parameter configured for the terminal device, the target DRX parameter is used for indicating a duration for which the terminal device stays in a DRX state.

In conjuncture with the second aspect, in some implementations of the second aspect, the first indicating information is specifically used for indicating an index of the target DRX parameter among a plurality of pre-configured DRX parameters.

In conjuncture with the second aspect, in some implementations of the second aspect, the first indicating information is specifically used for indicating a difference between an index of the target DRX parameter and an index of a first DRX parameter, where the first DRX parameter is any one of a plurality of pre-configured DRX parameters.

A third aspect provides a terminal device which includes modules configured to carry out the method according to the first aspect or various implementations thereof.

A fourth aspect provides a network device which includes modules configured to carry out the method according to the second aspect or various implementations thereof.

A fifth aspect provides a terminal device which includes a transceiver and a processor which, based on the transceiver, carries out the method according to the first aspect or various implementations thereof.

A sixth aspect provides a network device which includes a transceiver and a processor which, based on the transceiver, carries out the method according to the second aspect or various implementations thereof.

A seventh aspect provides a computer readable storage medium storing thereon program codes for execution by a device, the program codes including instructions to carry out the method according to the first aspect.

An eighth aspect provides a computer readable storage medium storing thereon program codes for execution by a device, the program codes including instructions to carry out the method according to the second aspect.

A ninth aspect provides a system-on-chip which includes an input interface, an output interface, a processor and a memory, the processor is configured to execute codes in the memory, where, when the codes are being executed, the processor is enabled to implement various procedures to be carried out by the terminal device according to the first aspect.

A tenth aspect provides a system-on-chip which includes an input interface, an output interface, a processor and a memory, the processor is configured to execute codes in the memory, where, when the codes are being executed, the processor is enabled to implement various procedures to be carried out by the network device according to the second aspect.

BRIEF DESCRIPTION OF THE DRAWINGS

FIG. 1 is a schematic diagram of a possible application scenario for an embodiment of the present application.

FIG. 2 is a schematic diagram of a DRX cycle.

FIG. 3 is a schematic flowchart of a method for determining a DRX state according to an embodiment of the present application.

DETAILED DESCRIPTION OF THE EMBODIMENTS

Figure 4:
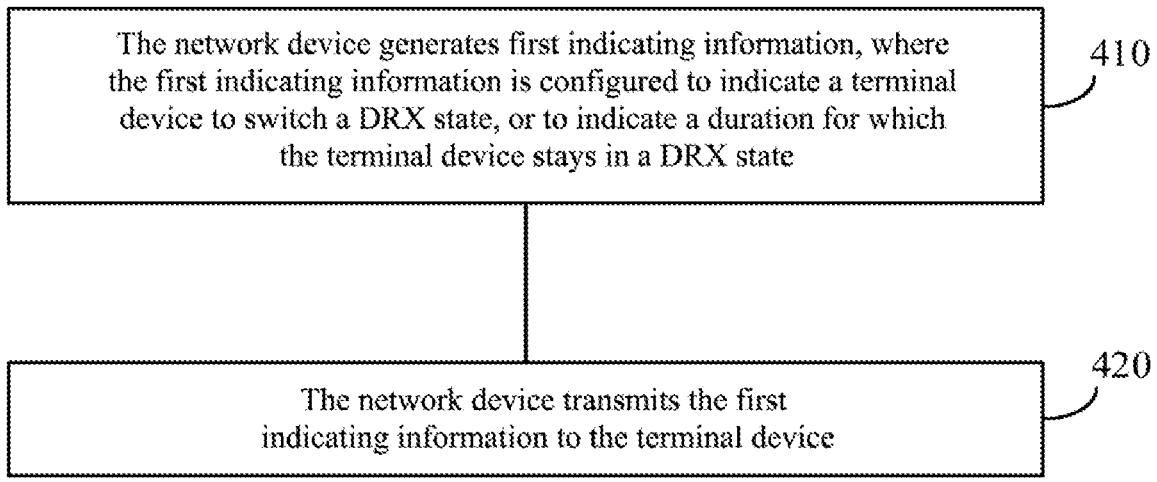
FIG. 4 is a schematic flowchart of a method for determining a DRX state according to an embodiment of the present application.

Now, the technical solutions in the embodiments of the present application will be described hereunder with reference to accompanying drawings.

The technical solutions in the embodiments of the present application may be applied to various communication systems, such as a global system of mobile communication (GSM) system, a code division multiple access (CDMA)

system, a wideband code division multiple access (WCDMA) system, a general packet radio service (GPRS), a long term evolution (LTE) system, a LTE frequency division duplex (FDD) system, LTE time division duplex (TDD), a universal mobile telecommunication system (UMTS), a worldwide interoperability for microwave access (WiMAX) communication system, or a next 5G system, or the like.

FIG. 1 illustrates a radio communication system 100 in which an embodiment of the present application is applied. The radio communication system 100 may include a network device 110. The network device 100 may be any device in communication with a terminal device. The network device 100 may provide communication coverage for a specific geographical region, and may communicate with a terminal device (e.g., a UE) within the coverage region. In an implementation, the network device 100 may be a base transceiver station (BTS) as in the GSM system or CDMA system, or a NodeB (NB) as in the WCDMA system, or an Evolutional Node B (eNB, or eNodeB) as in the LTE system, or a radio controller as in the cloud radio access network (CRAN). Alternatively, the network device may be a relay station, an access point (AP), a vehicle-mounted device, a wearable device, a network side device as in the further 5G network, or a network device as in the next evolution of public land mobile network (PLMN).

The radio communication system 100 also includes at least one terminal device 120 located within the coverage of the network device 110. The terminal device 120 may be mobile or stationary. In an implementation, a terminal device 120 may refer to an access terminal, a user equipment (UE), a subscriber unit, a subscriber station, a mobile station, a mobile platform, a remote station, a remote terminal, a mobile device, a user terminal, a terminal, a radio communication device, a user agent or a subscriber installation. The access terminal may be cellular phone, a cordless phone, a session initiation protocol (SIP) phone, a wireless local loop (WLL) station, a personal digital assistant (PDA), a handset with radio communication capability, a computing device or other processing device, vehicle-mounted device, wearable device, network side device as in the further 5G network, or a network device as in the next evolution of PLMN that has connection to a wireless modem.

In an implementation, the 5G system or network may also be referred to as new radio (NR) system or network.

For a better understanding of the method for determining a DRX state according to an embodiment of the present application, DRX will be briefly introduced hereunder in conjuncture with FIG. 2. As shown in FIG. 2, a complete DRX cycle consists of an On Duration and an Opportunity for DRX. When a specific trigger condition is fulfilled, a terminal device enters into the On Duration, during which a DRX-Inactivity Timer is started if the terminal device initiates a data scheduling request. If no scheduling information is received at the terminal device during a period timed by the DRX-Inactivity Timer, the terminal device enters the Opportunity for DRX when the DRX-Inactivity Timer elapses. If scheduling information is detected at the terminal device during the period timed by the DRX-Inactivity Timer, the terminal device may restart the DRX-Inactivity Timer to continue monitoring the physical downlink control channel (PDCCH).

It should be understood that the terminal device is in a first DRX state during the On Duration, and in a second DRX state during the Opportunity for DRX. Regardless of whether in the first DRX state or the second DRX state, the terminal device and the network device are both in an RRC connected state. When the terminal device is in the first DRX state (this is when the terminal device is in the On Duration), the terminal device turns on a receiver to monitor the PDCCH. When the terminal device is in the second DRX state (this is when the terminal device is in the Opportunity for DRX), the terminal device turns off the receiver and monitors the PDCCH no longer.

In existing LTE system, a network device operates through RRC signaling to statically configure DRX parameters for the terminal device, the DRX parameters including on Duration Timer, DRX-Inactivity Timer, DRX-Retransmission Timer, long DRX-Cycle Start Offset, short DRX-Cycle, DRX-Short Cycle Timer, Hybrid Auto Repeat Request Round Trip Time Timer (HARQ RTT Timer), etc.

The existing solution to statically configure the DRX parameters is utterly inflexible for it is unable to dynamically configure the DRX parameters for the terminal device as flexibly changing the DRX state that the terminal device stays in.

For instance, after the terminal device initiates a data scheduling request to the network device, the DRX-Inactivity Timer is turned on, and the terminal device begins monitoring the PDCCH. Having received the data scheduling request from the terminal device, the network device may be unable to schedule the terminal device within the timing period of the DRX-Inactivity Timer due to heavy traffic. However, since the DRX-Inactivity Timer has been turned on, the terminal device has to remain in a monitoring state until the DRX-Inactivity Timer expires. That is, during the timing period of the DRX-Inactivity Timer, does not schedule the terminal device, but the terminal device is kept in the monitoring state, leading to increased power consumption on the terminal device.

In view of the above, an embodiment of the present application proposes a method for determining a DRX state which uses dynamic indicating information to indicate the terminal device to flexibly switch, or change the duration of, the DRX state that the terminal device stays in. Now, in conjuncture with FIG. 3 and FIG. 4, a detailed introduction will be given about a method for determining DRX state according to an embodiment of the present application.

FIG. 3 is a schematic flowchart of a method for determining a DRX state according to an embodiment of the present application. The method as shown in FIG. 3 includes:

310, the terminal device receives first indicating information transmitted from a network device, where the first indicating information is used for indicating the terminal device to switch a DRX state, or used for indicating the duration for which the terminal device stays in a DRX state.

The first indicating information may indicate the terminal device to switch from a current DRX state to another DRX state; or indicate a duration for which the terminal device stays in its current DRX state; or a duration for which the terminal device stays in a next DRX state.

In an implementation, when the terminal device stays currently in a first DRX state, the first indicating information may indicate the terminal device to switch from the first DRX state to a second DRX state. Thus, the terminal device would switch from the first DRX state to the second DRX state after first indicating information is received. Specifically, when the terminal device is currently in a first DRX state, the network device may, when the network is heavily loaded or the terminal device has a low priority (e.g., the terminal device implements an enhanced mobile broadband traffic), generate the first indicating information to indicate the terminal device switch from the first DRX state to the second DRX state.

320, the terminal device switches a DRX state in which the terminal device currently stays according to the first indicating information, or determines the duration for which the terminal device stays in the DRX state according to the first indicating information, where the DRX state in which the terminal device currently stays is a first DRX state or a second DRX state, where a receiver of the terminal device is turned on (i.e., to monitor the PDCCH) when in the first DRX state, and turned off (i.e., to stop monitoring the PDCCH) when in the second DRX state.

In the embodiment of the present application, with the first indicating information, the DRX state, or the duration for which the terminal device is to remain in the DRX state, may be dynamically adjusted for the terminal device, which in turn improves the efficiency in transmitting data in the DRX mode by the terminal device, and reduces power consumption for the terminal device.

It should be understood that, when the first indicating information is used for indicating the duration for which the terminal device is to be in a DRX state, the DRX state may be one that the terminal device stays currently, or one that the terminal device stays in after a state switching.

In an implementation, when the terminal device is currently in the first DRX state and the first indicating information is used for indicating a duration for which the terminal device stays in the first DRX state, then the terminal device can determine the duration for which the terminal device stays in the first DRX state after the first indicating information is received.

With the first indicating information, the duration for which the terminal device stays in the first DRX state may be re-configured for the terminal device. That is, the duration the terminal device being in the first DRX state may be dynamically adjusted with the first indicating information, thereby improving efficiency of the terminal device in transmitting data in the DRX mode.

For instance, when a terminal device is in the first DRX state and the network is heavily loaded, such that the network device is unable to schedule the terminal device for some time at present, then the network device may operate through the first indicating information to reconfigure a shorter duration for the first DRX state to enable the terminal device to swiftly switch from the first DRX state to the second DRX state, thus reducing futile monitoring by the terminal device as well as power consumption.

In an implementation, the first indicating information may have various approaches of indicating the duration for which the terminal device stays in the first DRX state, the approaches may include at least the following:

(1) the first indicating information is specifically used for indicating a duration for which the first DRX state lasts is a first time interval.

For instance, a terminal device shall stay in a first DRX state for a duration of 30 ms according to a DRX parameter pre-configured by a network device for a terminal device, and the terminal device has stayed in the first DRX state for a duration of 10 ms. Now, first indicating information indicates 20 ms is the duration for the first DRX state. Thus, 20 ms, rather than the initial 30 ms, is the duration of the first DRX state as determined by the terminal device according to the first indicating information. That is, starting from now and after 10 ms, the terminal device will switch from the first DRX state to the second DRX state.

(2) the first indicating information is specifically used for indicating that the first DRX state is to last until a first moment.

For instance, the present time is 10 ms, a terminal device shall stay in a first DRX state from Urns to 30 ms according to a DRX parameter pre-configured by a network device for a terminal device. Now, first indicating information indicates the first DRX state is to last until 20 ms. Then, terminal device may, after receiving the first indicating information, determine the first DRX state is to last until 20 ms. Thus, when 20 ms is reached, the terminal device will need to switch from the first DRX state to the second DRX state.

In an implementation, when the terminal device is currently in the first DRX state, the first indicating information may be used for indicating a duration for which the terminal device stays in the second DRX state, where the second DRX state is the DRX state for the terminal device after switching away from the first DRX state. In this case, the terminal device may determine, according to the first indicating information, the duration for which the terminal device is to be in the second DRX state. That is, the terminal device may determine the duration for which the terminal device is to be in its next DRX state according to the first indicating information.

In an implementation, the first indicating information may have various approaches of indicating the duration for which the terminal device is in the second DRX state, the approaches may include at least the following:

(3) the first indicating information is specifically used for indicating a duration for which the second DRX state lasts is a second time interval.

For instance, a terminal device is to switch from its current first DRX state to a second DRX state after a while and will stay in the second DRX state for a duration of 30 ms according to a DRX parameter configured by a network device for the terminal device. Now, first indicating information indicates that the terminal device should stay in the second DRX state for a duration of 20 ms. Thus, after receiving the first indicating information, 20 ms will be duration for which the terminal device is to be in the second DRX state after switching to the state, thereby shortening the duration of the terminal device being in the second DRX state.

(4) the first indicating information is specifically used for indicating that the second DRX state is to last until a second moment.

For instance, a terminal device is to switch from its current first DRX state to a second DRX state at 10 ms, and should stay in the second DRX state between 10 ms to 40 ms according to a DRX parameter configured by a network device for the terminal device. Now, first indicating information indicates that the terminal device should stay in the second DRX state until 30 ms after switching thereto. Then, after receiving the first indicating information, the terminal device would be in the second DRX state between 10 ms to 30 ms, thereby shortening the duration of the terminal device being in the second DRX state.

It should be understood that the first indicating information may shorten, as well as extend, the duration for which the terminal device is in the first DRX state or second DRX state.

Now, in conjuncture with Embodiment 1 and Embodiment 2, a detailed introduction will be given about a method for determining a DRX state according to the present application.

Embodiment 1

After the terminal device initiates a data scheduling request to the network device, the DRX-Inactivity Timer is turned on, and the terminal device begins to monitor the PDCCH. Having received the data scheduling request from the terminal device, the network device may be unable to schedule the terminal device within the timing period of the DRX-Inactivity Timer due to heavy traffic. Thus, the network device sends indication information to the terminal device to indicate it to switch from the On Duration to the Opportunity for DRX, to reduce power consumption for the terminal device.

Embodiment 2

A network device operates though RRC signaling to configure a length of 8 sub-frames to be a HARQ RTT Timer for a terminal device. When swift HARQ feedback is required, the network device may operate through indicating information to indicate a duration of 4 sub-frames for the HARQ RTT Timer, so as to enable the terminal device to swiftly switch from Opportunity for DRX to On Duration to monitor the PDCCH. On the other hand, when no swift HARQ feedback is required, the network device may operate through indicating information to indicate a duration of 12 sub-frames for the HARQ RTT Timer, so as to allow the terminal device to stay longer in the Opportunity for DRX before switching to the On Duration.

In an implementation, the first indicating information may also be carried in a MAC CE. Specifically, as shown in Table 1, which shows logical channel instances of MAC service data unit (SDU) corresponding to the field identity (ID) of the logical channel and corresponding MAC CE or padding types.

The foregoing first indicating information may carry at least one of the DRX Command MAC CE, Long DRX Command MAC CE and Reserved MAC CE as indicated by the logical channel as shown in Table 1.

TABLE 1

| Index | Identity value of the logical channel |
| --- | --- |
| 00000 | Common control channel (CCCH) |
| 00001-01010 | Identity of the logical channel |
| 01011-10111 | Reserved |
| 11000 | Activation/Deactivation |
| 11001 | Single cell multicast control channel (SC-MCCH) |
|  | Single cell multicast traffic channel (SC-MTCH) |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

In an implementation, the foregoing first indicating information may be carried in downlink control information (DCI).

Specifically, the first indicating information may be represented by adding a new domain (DRX-Trigger) into the DCI. The DRX-Trigger may be one-bit information, where "0" represents triggering the terminal device to switch from the first DRX state to the second DRX state, and "1" represents triggering the terminal device to remain in its current first DRX state.

In an implementation, the terminal device may receive the first indicating information transmitted from the network device via a dedicated downlink control channel or a common control channel.

In an implementation, the network device may pre-configure for the terminal device a plurality of DRX parameters.

In this case, the first indicating information may be used for indicating a target DRX parameter dynamically configured by the network device for the terminal device, where the target DRX parameter is used for indicating a duration for which the terminal device stays in a DRX state.

The first indicating information may provide various means for indicating the target DRX parameter. For instance, the first indicating information may specifically indicate an index of a target DRX parameter among a plurality of pre-configured DRX parameters. The first indicating information may also specifically indicate a difference between an index of the target DRX parameter and an index of a first DRX parameter, where the first DRX parameter is any one of a plurality of pre-configured DRX parameters. In an implementation, the first DRX parameter may be a default DRX parameter pre-configured by the network device via RRC signaling for the terminal device.

That is, the first indicating information may provide a direct indication to indicate the index of the target DRX parameter, or an indirect indication to indicate a difference between an index of the target DRX parameter and an index of a first DRX parameter.

It should be understood that the first indicating information is not only capable of operating directly, through the first indicating information itself to indicate a duration for which the terminal device stays in a DRX state (in this case, the first indicating information indicates timing information). The first indicating information is also capable of operating indirectly, through indicating a target DRX parameter, to indicate the duration for which the terminal device is in the DRX state.

The foregoing has described in detail a method for determining a DRX state according to an embodiment of the present application from the perspective of a terminal device and in view of FIG. 3. Now, in conjunction with FIG. 4, description will be laid out about a method for determining a DRX state according to an embodiment of the present application from the perspective of a network device. It should be understood that, the method for determining DRX state according to the embodiment of the present application as described in the following in connection with FIG. 4 from the perspective of the network device corresponds to that as described in connection with FIG. 3 from the perspective of the terminal device, and relevant descriptions will not be repeated herein when appropriate for the sack of simplicity.

FIG. 4 is a schematic flowchart of a method for determining a DRX state according to an embodiment of the present application. The method as shown in FIG. 4 includes:

410, the network device generates first indicating information, where the first indicating information is used for indicating a terminal device to switch a DRX state, or used for indicating a duration for which the terminal device stays in a DRX state;

420, the network device transmits the first indicating information to the terminal device.

In the embodiment of the present application, with the first indicating information, the DRX state, or the duration for which the terminal device stays in the DRX state, may be dynamically adjusted for the terminal device according to the network condition, which improves the efficiency in transmitting data in the DRX mode by the terminal device, and reduces power consumption for the terminal device.

In an implementation, the method may further include: determining, by the network device, the first indicating information according to network load.

In an implementation, the DRX state in which the terminal device currently stays is a first DRX state, the first indicating information is used for indicating the terminal device to switch to a second DRX state, where a receiver of the terminal device is turned on when in the first DRX state, and turned off when in the second DRX state.

In an implementation, the DRX state in which the terminal device currently stays is a first DRX state, the first indicating information is used for indicating the duration for which the terminal device stays in the first DRX state, where a receiver of the terminal device is turned on when in the first DRX state.

In an implementation, the first indicating information is specifically used for indicating that a duration for which the first DRX state lasts is a first time interval.

In an implementation, the first indicating information is specifically used for indicating that the first DRX state is to last until a first moment.

In an implementation, the DRX state in which the terminal device currently stays is the first DRX state, the first indicating information is used for indicating the duration for which the terminal device stays in the second DRX state, where the second DRX state is a DRX state that the terminal device stays in after switching away from the first DRX state, where a receiver of the terminal device is turned on when in the first DRX state, and turned off when in the second DRX state.

In an implementation, the first indicating information is specifically used for indicating that the second DRX state is to last for a second time interval.

In an implementation, the first indicating information is specifically used for indicating that the second DRX state is to last until a second moment.

In an implementation, the first indicating information is carried in downlink control information (DCI).

In an implementation, the first indicating information is carried in a media access control element (MAC CE).

In an implementation, the first indicating information is carried in at least one of a DRX command MAC CE, a long DRX command MAC CE, and a MAC CE indicated by a reserved logic channel indicator sub-header.

In an implementation, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating a duration for which the terminal device stays in a DRX state.

In an implementation, the transmitting, by the network device, the first indicating information to the terminal device includes:

transmitting, by the network device, the first indicating information to the terminal device via a dedicated downlink control channel or a common control channel.

In an implementation, the first indicating information is used for indicating a target DRX parameter configured for the terminal device, the target DRX parameter is used for indicating a duration for which the terminal device stays in a DRX state.

In an implementation, the first indicating information is specifically used for indicating an index of the target DRX parameter among a plurality of pre-configured DRX parameters.

In an implementation, the first indicating information is specifically used for indicating a difference between an index of the target DRX parameter and an index of a first DRX parameter, where the first DRX parameter is any one of a plurality of pre-configured DRX parameters.

The method for determining a DRX state according to an embodiment of the present application has been detailed above in conjuncture with FIG. 3 and FIG. 4. Now, a terminal device and a network device according to an embodiment of the present application will be detailed in conjunction with FIG. 5 to FIG. 8. It should be understood that the terminal device and network device as depicted in FIG. 5 to FIG. 8 are capable of implementing the various steps to be executed by the terminal device and network device as depicted in FIG. 3 and FIG. 4, which will not be repeated herein to avoid redundancy.

Figure 5:
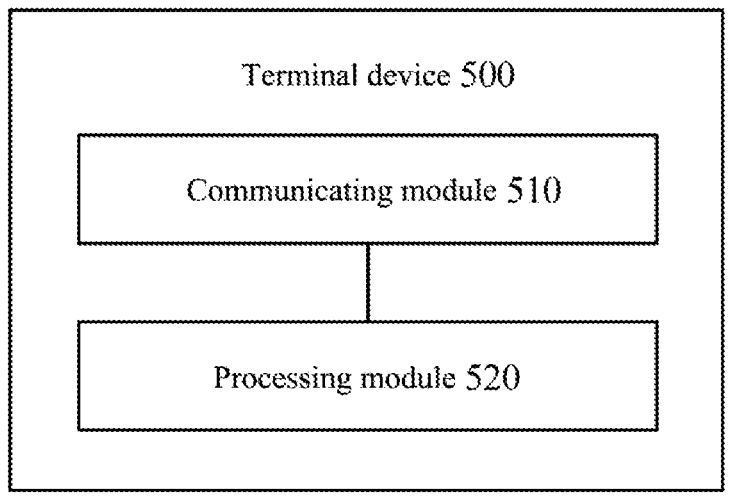
FIG. 5 is a schematic structural diagram of a terminal device according to an embodiment of the present application.

FIG. 5 is a schematic structural diagram of a terminal device according to an embodiment of the present application. The terminal device 500 in FIG. 5 includes:

a communicating module 510, configured to receive first indicating information transmitted from a network device, where the first indicating information is used for indicating the terminal device to switch a DRX state, or used for indicating a duration for which the terminal device stays in a DRX state; and a processing module 520, configured to switch a DRX state in which the terminal device currently stays according to the first indicating information, or determine the duration for which the terminal device stays in the DRX state according to the first indicating information, where the DRX state in which the terminal device currently stays is a first DRX state or a second DRX state, where a receiver of the terminal device is turned on when in the first DRX state, and turned off when in the second DRX state.

In an implementation, the DRX state in which the terminal device currently stays is a first DRX state, the first indicating information indicates the terminal device to switch to the second DRX state, and the processing module 520 is specifically configured to: switch from the first DRX state to the second DRX state according to the first indicating information.

In an implementation, the DRX state in which the terminal device currently stays is the first DRX state, the first indicating information is used for indicating a duration for which the terminal device stays in the first DRX state, and the processing module 520 is specifically configured to: determine the duration for which the terminal device stays in the first DRX state according to the first indicating information.

In an implementation, the first indicating information is specifically used for indicating a duration for which the first DRX state lasts is a first time interval, and the processing module 520 is specifically configured to: determine the first time interval to be the duration for which the first DRX state lasts according to the first indicating information.

In an implementation, the first indicating information is used for indicating that the first DRX state is to last until a first moment, and the processing module 520 is specifically configured to: determine that the first DRX state lasts until the first moment according to the first indicating information.

In an implementation, the DRX state in which the terminal device currently stays is the first DRX state, the first indicating information is used for indicating a duration for which the terminal device stays in the second DRX state, where the second DRX state is a DRX state that the terminal device stays in after switching away from the first DRX state, and the processing module 520 is specifically configured to: determine the duration for which the terminal device stays in the second DRX state according to the first indicating information.

In an implementation, the first indicating information is specifically used for indicating a duration for which the second DRX state lasts is a second time interval, and the processing module 520 is specifically configured to: determine the second time interval to be the duration for which the second DRX state lasts according to the first indicating information.

In an implementation, the first indicating information is used for indicating that the second DRX state is to last until a second moment, and the processing module 520 is specifically configured to: determine that the second DRX state lasts until the second moment according to the first indicating information.

In an implementation, the first indicating information is carried in downlink control information (DCI).

In an implementation, the first indicating information is carried in a media access control element (MAC CE).

In an implementation, the MAC CE includes at least one of a DRX command MAC CE, a long DRX command MAC CE, and a MAC CE indicated by a reserved logic channel indicator sub-header.

In an implementation, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating a duration for which the terminal device stays in a DRX state.

In an implementation, the communicating module 510 is specifically configured to receive the first indicating information transmitted from the network device via a dedicated downlink control channel or a common control channel.

In an implementation, the first indicating information is used for indicating a target DRX parameter configured for the terminal device, the target DRX parameter is used for indicating a duration for which the terminal device stays in a DRX state.

In an implementation, the first indicating information is specifically used for indicating an index of the target DRX parameter among a plurality of pre-configured DRX parameters.

In an implementation, the first indicating information is specifically used for indicating a difference between an index of the target DRX parameter and an index of a first DRX parameter, where the first DRX parameter is any one of a plurality of pre-configured DRX parameters.

Figure 6:
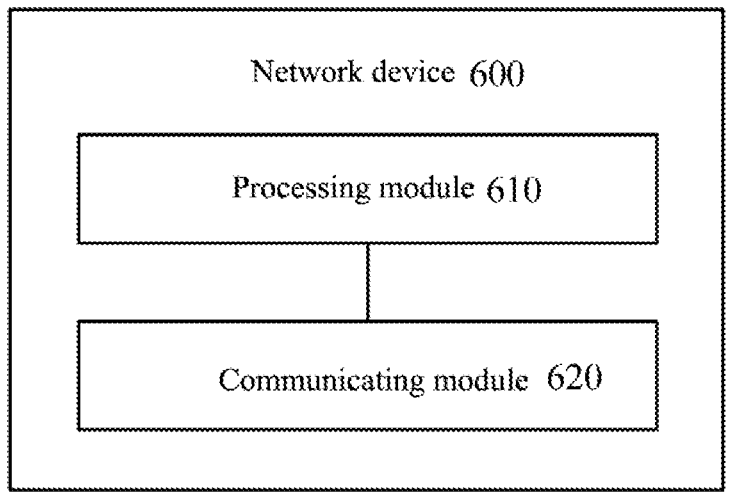
FIG. 6 is a schematic structural diagram of a network device according to an embodiment of the present application.

FIG. 6 is a schematic structural diagram of a network device according to an embodiment of the present application. The network device 600 in FIG. 6 include:

a processing module 610, configured to generate first indicating information, where the first indicating information is used for indicating a terminal device to switch a DRX state, or used for indicating a duration for which the terminal device stays in a DRX state; and a communicating module 620, configured to transmit the first indicating information to the terminal device.

In an implementation, the processing module 610 is further configured to determine the first indicating information according to network load.

In an implementation, a DRX state in which the terminal device currently stays is a first DRX state, the first indicating information is used for indicating the terminal device to switch to a second DRX state, where a receiver of the terminal device is turned on when in the first DRX state, and turned off when in the second DRX state.

In an implementation, the DRX state in which the terminal device currently stays is a first DRX state, the first indicating information is used for indicating the duration for which the terminal device stays in the first DRX state, where a receiver of the terminal device is turned on when in the first DRX state.

In an implementation, the first indicating information is specifically used for indicating that a duration for which the first DRX state lasts is a first time interval.

In an implementation, the first indicating information is specifically used for indicating that the first DRX state is to last until a first moment.

In an implementation, the DRX state in which the terminal device currently stays is the first DRX state, the first indicating information is used for indicating the duration for which the terminal device stays in the second DRX state, where the second DRX state is a DRX state that the terminal device stays in after switching away from the first DRX state, where a receiver of the terminal device is turned on when in the first DRX state, and turned off when in the second DRX state.

In an implementation, the first indicating information is specifically used for indicating a duration for which the second DRX state lasts is a second time interval.

In an implementation, the first indicating information is specifically used for indicating that the second DRX state is to last until a second moment.

In an implementation, the first indicating information is carried in downlink control information (DCI).

In an implementation, the first indicating information is carried in a media access control element (MAC CE).

In an implementation, the first indicating information is carried in at least one of a DRX command MAC CE, a long DRX command MAC CE, and a MAC CE indicated by a reserved logic channel indicator sub-header.

In an implementation, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating the duration for which the terminal device stays in a DRX state.

In an implementation, the transmitting, by the network device, the first indicating information to the terminal device includes: transmitting, by the network device, the first indicating information to the terminal device via a dedicated downlink control channel or a common control channel.

In an implementation, the first indicating information is used for indicating a target DRX parameter configured for the terminal device, the target DRX parameter is used for indicating a duration for which the terminal device stays in a DRX state.

In an implementation, the first indicating information is specifically used for indicating an index of the target DRX parameter among a plurality of pre-configured DRX parameters.

In an implementation, the first indicating information is specifically used for indicating a difference between an index of the target DRX parameter and an index of a first DRX parameter, where the first DRX parameter is any one of a plurality of pre-configured DRX parameters.

Figure 7:
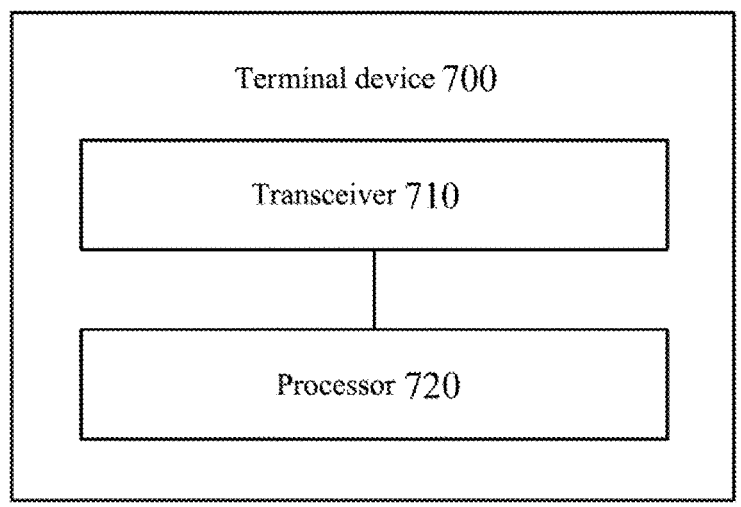
FIG. 7 is a schematic structural diagram of a terminal device according to an embodiment of the present application.

FIG. 7 is a schematic structural diagram of a terminal device according to an embodiment of the present application. The terminal device 700 in FIG. 7 includes:

a transceiver 710, configured to receive first indicating information transmitted from a network device, where the first indicating information is used for indicating the terminal device to switch a DRX state, or used for indicating a duration for which the terminal device stays in a DRX state; and a processor 720, configured to switch a DRX state in which the terminal device currently stays according to the first indicating information, or determine the duration for which the terminal device stays in the DRX state according to the first indicating information, where the DRX state in which the terminal device currently stays is a first DRX state or a second DRX state, where a receiver of the terminal device is turned on when in the first DRX state, and turned off when in the second DRX state.

In an implementation, the DRX state in which the terminal device currently stays is a first DRX state, the first indicating information indicates the terminal device to switch to the second DRX state, and the processor 720 is specifically configured to: switch from the first DRX state to the second DRX state according to the first indicating information.

In an implementation, the DRX state in which the terminal device currently stays is the first DRX state, the first indicating information is used for indicating a duration for which the terminal device stays in the first DRX state, and the processor 720 is specifically configured to: determine the duration for which the terminal device stays in the first DRX state according to the first indicating information.

In an implementation, the first indicating information is specifically used for indicating a duration for which the first DRX state lasts is a first time interval, and the processor 720 is specifically configured to: determine the first time interval to be the duration for which the first DRX state lasts according to the first indicating information.

In an implementation, the first indicating information is used for indicating that the first DRX state is to last until a first moment, and the processor 720 is specifically configured to: determine that the first DRX state lasts until the first moment according to the first indicating information.

In an implementation, the DRX state in which the terminal device currently stays is the first DRX state, the first indicating information is used for indicating a duration for which the terminal device stays in the second DRX state, where the second DRX state is a DRX state that the terminal device stays in after switching away from the first DRX state, and the processor 720 is specifically configured to: determine the duration for which the terminal device stays in the second DRX state according to the first indicating information.

In an implementation, the first indicating information is specifically used for indicating a duration for which the second DRX state lasts is a second time interval, and the processor 720 is specifically configured to: determine the second time interval to be the duration for which the second DRX state lasts according to the first indicating information.

In an implementation, the first indicating information is used for indicating that the second DRX state is to last until a second moment, and the processor 720 is specifically configured to: determine that the second DRX state lasts until the second moment according to the first indicating information.

In an implementation, the first indicating information is carried in downlink control information (DCI).

In an implementation, the first indicating information is carried in a media access control element (MAC CE).

In an implementation, the MAC CE includes at least one of a DRX command MAC CE, a long DRX command MAC CE, and a MAC CE indicated by a reserved logic channel indicator sub-header.

In an implementation, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating a duration for which the terminal device stays in a DRX state.

In an implementation, the transceiver 710 is specifically configured to receive the first indicating information transmitted from the network device via a dedicated downlink control channel or a common control channel.

In an implementation, the first indicating information is used for indicating a target DRX parameter configured for the terminal device, the target DRX parameter is used for indicating a duration for which the terminal device stays in a DRX state.

In an implementation, the first indicating information is specifically used for indicating an index of the target DRX parameter among a plurality of pre-configured DRX parameters.

In an implementation, the first indicating information is specifically used for indicating a difference between an index of the target DRX parameter and an index of a first DRX parameter, where the first DRX parameter is any one of a plurality of pre-configured DRX parameters.

Figure 8:
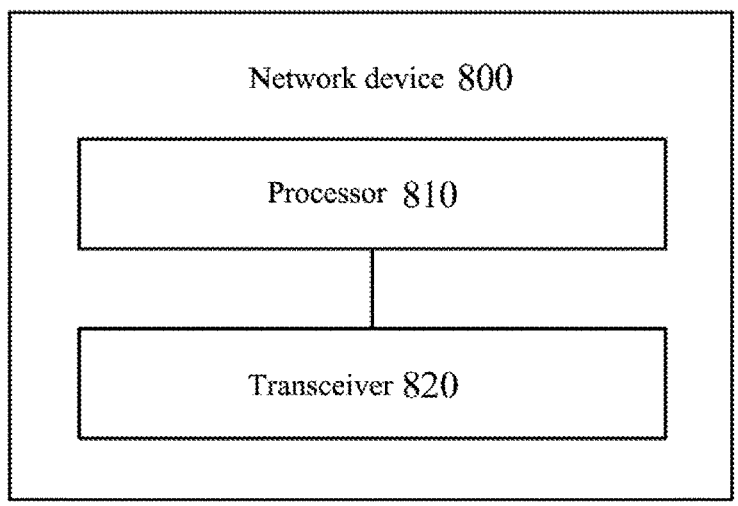
FIG. 8 is a schematic structural diagram of a network device according to an embodiment of the present application.

FIG. 8 is a schematic structural diagram of a network device according to an embodiment of the present application. The network device 800 in FIG. 8 include:

a processor 810, configured to generate first indicating information, where the first indicating information is used for indicating a terminal device to switch a DRX state, or used for indicating a duration for which the terminal device stays in a DRX state; and a transceiver 820, configured to transmit the first indicating information to the terminal device.

In an implementation, the processor 810 is further configured to determine the first indicating information according to network load.

In an implementation, a DRX state in which the terminal device currently stays is a first DRX state, the first indicating information is used for indicating the terminal device to switch to a second DRX state, where a receiver of the terminal device is turned on when in the first DRX state, and turned off when in the second DRX state.

In an implementation, the DRX state in which the terminal device currently stays is a first DRX state, the first indicating information is used for indicating the duration for which the terminal device stays in the first DRX state, where a receiver of the terminal device is turned on when in the first DRX state.

In an implementation, the first indicating information is specifically used for indicating a duration for which the first DRX state lasts is a first time interval.

In an implementation, the first indicating information is specifically used for indicating that the first DRX state is to last until a first moment.

In an implementation, where the DRX state in which the terminal device currently stays is the first DRX state, the first indicating information is used for indicating the duration for which the terminal device stays in the second DRX state, where the second DRX state is a DRX state that the terminal device stays in after switching away from the first DRX state, wherein a receiver of the terminal device is turned on when in the first DRX state, and turned off when in the second DRX state.

In an implementation, the first indicating information is specifically used for indicating a duration for which the second DRX state lasts is a second time interval.

In an implementation, the first indicating information is specifically used for indicating that the second DRX state is to last until a second moment.

In an implementation, the first indicating information is carried in downlink control information (DCI).

In an implementation, the first indicating information is carried in a media access control element (MAC CE).

In an implementation, the first indicating information is carried in at least one of a DRX command MAC CE, a long DRX command MAC CE, and a MAC CE indicated by a reserved logic channel indicator sub-header.

In an implementation, in case that the first indicating information is carried in the MAC CE indicated by a reserved logic channel indicator sub-header, the first indicating information includes at least one of DRX state switching information or DRX duration information, where the DRX state switching information is used for indicating the terminal device to switch a DRX state, and the DRX duration information is used for indicating the duration for which the terminal device stays in a DRX state.

In an implementation, the transmitting, by the network device, the first indicating information to the terminal device includes: transmitting, by the network device, the first indicating information to the terminal device via a dedicated downlink control channel or a common control channel.

In an implementation, the first indicating information is used for indicating a target DRX parameter configured for the terminal device, the target DRX parameter is used for indicating the duration for which the terminal device stays in a DRX state.

In an implementation, the first indicating information is specifically used for indicating an index of the target DRX parameter among a plurality of pre-configured DRX parameters.

In an implementation, the first indicating information is specifically used for indicating a difference between an index of the target DRX parameter and an index of a first DRX parameter, where the first DRX parameter is any one of a plurality of pre-configured DRX parameters.

Figure 9:
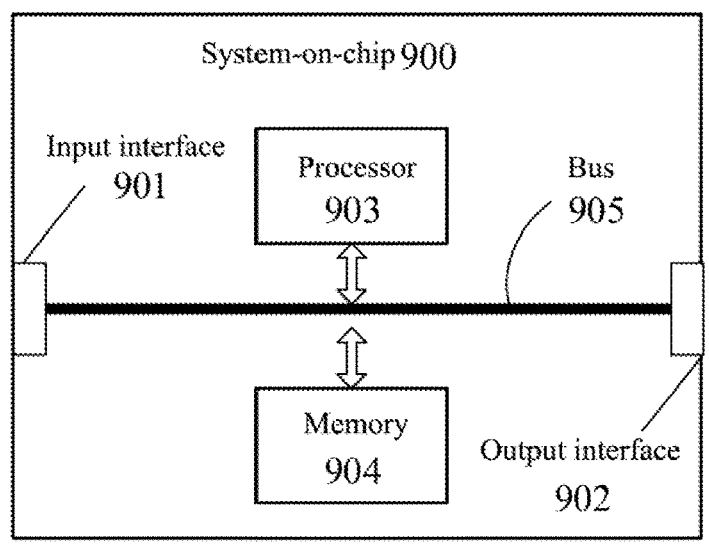
FIG. 9 is a schematic structural diagram of a system-on-chip according to an embodiment of the present application.

FIG. 9 is a schematic structural diagram of a system-on-chip according to an embodiment of the present application. The system-on-chip 900 as depicted in FIG. 9 includes an input interface 901, an output interface 902, a processor 903 and a memory 904. The processor 903 and the memory 904 are interconnected via a bus 905, the processor 903 is configured to execute codes stored in the memory 904.

In an implementation, when the codes are executed, the processor 903 implements a method to be implemented by a terminal device as in a method embodiment. For the sack of brevity, no recitation will be made herein.

In an implementation, when the codes are executed, the processor 903 implements a method to be implemented by a network device as in a method embodiment. For the sack of brevity, no recitation will be made herein.

Those skilled will appreciate that the elements and algorithm steps of various examples as described in connection with the disclosed embodiments may be implemented in electronic hardware, computer software of combinations thereof. Whether the functions are to be carried out in the form of hardware or software will depend on the specific application and design constraints to which the technical solution applies. Those skilled may use different approach for individual application to implement the functions described hereinabove, but such implementation shall not be deemed to be out of the scope of the present application.

Those skilled may clearly understand that, for the specific operating process of the systems, devices and elements described above, reference may be made to the corresponding processes in the foregoing method embodiments, which will not be repeated herein.

In the embodiments provided in the present application, it should be understood that the disclosed apparatus and method may be implemented by other means. For instance, the apparatus embodiments described above are merely illustrative. For instance, the units are separated by their logical functions only, and other separations are possible in practical implementation. For instance, multiple units or components may be combined, or be integrated with another system, or some features may be omitted or skipped. In addition, the inter-couplings illustrated or discussed, whether a direct coupling or communication connection, may be an indirect coupling or communication connection via some kind of interface, apparatus or unit, and may be electrical, mechanical or otherwise.

The units described as separate components may or may not be physically separated, and the components displayed as a unit may or may not be a physical unit, that is, they may be located at one place, or may be distributed to multiple network elements. Some or all of the units may be selected according to actual needs to achieve the purpose of the solution of the embodiments.

In addition, various functional units in various embodiment of the present application may be integrated into a single processing unit, or be physically separated into stand-alone units, or two or more units may be integrated into one unit.

A function may be stored in a computer readable storage medium when being implemented in the form of the software functional unit and marketed or used as a standalone product. Based on the understanding, the technical solution of the present application, or the part thereof making contribution to prior art, or part thereof may manifest in the form of software product. The computer software product may be stored in a storage medium including a number of instructions to cause a computing device (which may be a personal computer, a server or a network device) to implement some or all steps of a method according to an embodiment of the present application. The storage medium includes: a USB thumb, a portable hard disk, a read-only memory (ROM), a random access memory (RAM), a magnetic disk, or an optical disk, and the like, which may store program codes.

The above descriptions are merely specific embodiments of the present application, but the protection scope of the present application is not limited thereto. Any person skilled in the art can easily think of changes or alternatives within the technical scope disclosed in the present application, which should fall into the protection scope of the present application. Thus, the protection scope of the present application shall be subject to the protection scope of the claims.

What is claimed is:

1. A method for determining a discontinuous reception (DRX) state, comprising:
receiving, by a terminal device, first indicating information transmitted from a network device, wherein the first indicating information is used for indicating the terminal device to switch a DRX state, or used for indicating a duration for which the terminal device stays in a DRX state; and switching, by the terminal device, a DRX state in which the terminal device stays according to the first indicating information, or determining the duration for which the terminal device stays in the DRX state according to the first indicating information, wherein the DRX state in which the terminal device stays is a first DRX state or a second DRX state, wherein a receiver of the terminal device is turned on when in the first DRX state, and turned off when in the second DRX state;

wherein the first indicating information is carried in a media access control element (MAC CE), the MAC CE comprises at least one of a DRX command MAC CE, a long DRX command MAC CE, and a MAC CE indicated by a reserved logic channel indicator sub-header;

wherein, in case that the first indicating information is carried in the MAC CE indicated by a reserved logic channel indicator sub-header, the first indicating information comprises at least one of DRX state switching information or DRX duration information, wherein the DRX state switching information is used for indicating the terminal device to switch a DRX state, and the DRX duration information is used for indicating the duration for which the terminal device stays in a DRX state.

2. The method according to claim 1, wherein the DRX state in which the terminal device stays is a first DRX state, the first indicating information indicates the terminal device to switch to the second DRX state, and the switching, by the terminal device, a DRX state comprises:

switching, by the terminal device, from the first DRX state to the second DRX state according to the first indicating information.

3. The method according to claim 1, wherein the DRX state in which the terminal device stays is the first DRX state, the first indicating information is used for indicating the duration for which the terminal device stays in the first DRX state, and the determining, by the terminal device, the duration for which the terminal device stays in the DRX state comprises:

determining, by the terminal device, the duration for which the terminal device stays in the first DRX state according to the first indicating information.

4. The method according to claim 3, wherein the first indicating information is used for indicating a duration for which the first DRX state lasts is a first time interval, and the determining, by the terminal device, the duration for which the terminal device stays in the first DRX state according to the first indicating information comprises:

determining, by the terminal device, the first time interval to be the duration for which the first DRX state lasts according to the first indicating information.

5. The method according to claim 3, wherein the first indicating information is used for indicating that the first DRX state is to last until a first moment, and the determining, by the terminal device, the duration for which the terminal device stays in the first DRX state according to the first indicating information comprises:

determining, by the terminal device, that the first DRX state lasts until the first moment according to the first indicating information.

6. The method according to claim 1, wherein the DRX state in which the terminal device stays is the first DRX state, the first indicating information is used for indicating a duration for which the terminal device stays in the second DRX state, wherein the second DRX state is a DRX state that the terminal device stays in after switching away from the first DRX state, and the determining, by the terminal device, the duration for which the terminal device stays in the DRX state comprises:

determining, by the terminal device, the duration for which the terminal device stays in the second DRX state according to the first indicating information.

7. The method according to claim 6, wherein the first indicating information is used for indicating a duration for which the second DRX state lasts is a second time interval, and the determining, by the terminal device, the duration for which the terminal device stays in the second DRX state according to the first indicating information comprises:

determining, by the terminal device, the second time interval to be the duration for which the second DRX state lasts according to the first indicating information.

8. The method according to claim 6, wherein the first indicating information is used for indicating that the second DRX state is to last until a second moment, and the determining, by the terminal device, the duration for which the terminal device stays in the second DRX state according to the first indicating information comprises:

determining, by the terminal device, that the second DRX state lasts until the second moment according to the first indicating information.

9. The method according to claim 1, wherein the receiving, by a terminal device, first indicating information transmitted from a network device comprises:

receiving, by the terminal device, the first indicating information transmitted from the network device via a dedicated downlink control channel or a common control channel.

10. The method according to claim 1, wherein the first indicating information is used for indicating a target DRX parameter configured for the terminal device, the target DRX parameter is used for indicating the duration for which the terminal device stays in a DRX state.

11. The method according to claim 10, wherein the first indicating information is used for indicating an index of the target DRX parameter among a plurality of pre-configured DRX parameters.

12. The method according to claim 10, wherein the first indicating information is used for indicating a difference between an index of the target DRX parameter and an index of a first DRX parameter, wherein the first DRX parameter is any one of a plurality of pre-configured DRX parameters.

13. A terminal device, comprising:

a transceiver, configured to receive first indicating information transmitted from a network device, wherein the first indicating information is used for indicating the terminal device to switch a discontinuous reception (DRX) state, or used for indicating a duration for which the terminal device stays in a DRX state; and a processor, configured to switch a DRX state in which the terminal device stays according to the first indicating information, or determine the duration for which the terminal device stays in the DRX state according to the first indicating information, wherein the DRX state in which the terminal device stays is a first DRX state or a second DRX state, wherein a receiver of the terminal device is turned on when in the first DRX state, and turned off when in the second DRX state;

wherein the first indicating information is carried in a media access control element (MAC CE), the MAC CE comprises at least one of a DRX command MAC CE, a long DRX command MAC CE, and a MAC CE indicated by a reserved logic channel indicator sub-header;

wherein, in case that the first indicating information is carried in the MAC CE indicated by a reserved logic channel indicator sub-header, the first indicating information comprises at least one of DRX state switching information or DRX duration information, wherein the DRX state switching information is used for indicating the terminal device to switch a DRX state, and the DRX duration information is used for indicating the duration for which the terminal device stays in a DRX state.

14. The terminal device according to claim 13, wherein the DRX state in which the terminal device stays is a first DRX state, the first indicating information indicates the terminal device to switch to the second DRX state, and the processor is configured to:

switch from the first DRX state to the second DRX state according to the first indicating information.

15. The terminal device according to claim 13, wherein the DRX state in which the terminal device stays is the first DRX state, the first indicating information is used for indicating a duration for which the terminal device stays in the first DRX state, and the processor is configured to:

determine the duration for which the terminal device stays in the first DRX state according to the first indicating information.

16. The terminal device according to claim 15, wherein the first indicating information is used for indicating a duration for which the first DRX state lasts is a first time interval, and the processor is configured to:

determine the first time interval to be the duration for which the first DRX state lasts according to the first indicating information.

17. The terminal device according to claim 15, wherein the first indicating information is used for indicating that the first DRX state is to last until a first moment, and the processor is configured to:

determine that the first DRX state lasts until the first moment according to the first indicating information.

18. The terminal device according to claim 13, wherein the DRX state in which the terminal device stays is the first DRX state, the first indicating information is used for indicating a duration for which the terminal device stays in the second DRX state, wherein the second DRX state is a DRX state that the terminal device stays in after switching away from the first DRX state, and the processor is configured to:

determine the duration for which the terminal device stays in the second DRX state according to the first indicating information.

19. The terminal device according to claim 18, wherein the first indicating information is used for indicating a duration for which the second DRX state lasts is a second time interval, and the processor is configured to:

determine the second time interval to be the duration for which the second DRX state lasts according to the first indicating information.

20. The terminal device according to claim 18, wherein the first indicating information is used for indicating that the second DRX state is to last until a second moment, and the processor is configured to:

determine that the second DRX state lasts until the second moment according to the first indicating information.

21. The terminal device according to claim 13, wherein the transceiver is configured to receive the first indicating information transmitted from the network device via a dedicated downlink control channel or a common control channel.

22. The terminal device according to claim 13, wherein the first indicating information is used for indicating a target DRX parameter configured for the terminal device, the target DRX parameter is used for indicating the duration for which the terminal device stays in a DRX state.

23. The terminal device according to claim 22, wherein the first indicating information is used for indicating an index of the target DRX parameter among a plurality of pre-configured DRX parameters.

24. The terminal device according to claim 22, wherein the first indicating information is used for indicating a difference between an index of the target DRX parameter and an index of a first DRX parameter, wherein the first DRX parameter is any one of a plurality of pre-configured DRX parameters.

* * * * *